US009471612B2

(12) United States Patent
Wang et al.

(10) Patent No.: US 9,471,612 B2
(45) Date of Patent: Oct. 18, 2016

(54) DATA PROCESSING METHOD, DATA QUERY METHOD IN A DATABASE, AND CORRESPONDING DEVICE

(71) Applicant: International Business Machines Corporation, Armonk, NY (US)

(72) Inventors: Kun Wang, Beijing (CN); Tianyi Wang, Beijing (CN); Yu Yuan, Beijing (CN); Zhang Yue, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 507 days.

(21) Appl. No.: 13/928,537

(22) Filed: Jun. 27, 2013

(65) Prior Publication Data

US 2014/0012858 A1    Jan. 9, 2014

(30) Foreign Application Priority Data

Jun. 29, 2012 (CN) .......................... 2012 1 0224193

(51) Int. Cl.
G06F 17/30 (2006.01)

(52) U.S. Cl.
CPC .............................. G06F 17/30333 (2013.01)

(58) Field of Classification Search
CPC ............................................... G06F 17/30333
USPC ................................................. 707/741, 743
See application file for complete search history.

(56) References Cited

U.S. PATENT DOCUMENTS 6,272,495 B1 * 8/2001 Hetherington .... G06F 17/30684
6,370,142 B1    4/2002 Pitcher et al.
(Continued)

FOREIGN PATENT DOCUMENTS

CN        1441579      9/2003
CN      101051958     10/2007
(Continued)

OTHER PUBLICATIONS

Guo, Xiangfeng, et al., "Efficient Event Matching in Publish/subscribe: Based on Routing Destination and Matching History", NAS 2008, Chongqing, China, Jun. 12-14, 2008, pp. 129-136.*
(Continued)

*Primary Examiner* — Robert Stevens
(74) *Attorney, Agent, or Firm* — F. Chau & Associates, LLC (57) ABSTRACT

A data processing method, data query method in a database, and corresponding device. A data processing, wherein a query request for data records includes information indicating a source and destination IP address, the source IP address including N sections, the destination IP address including M sections, both M and N being positive integers, the method including: determining an index encoding manner for the database, wherein the index is an one-dimensional index including N+M sections, the encoding manner specifying a variation sequence of various sections for the index, at least one of the source IP address and the destination address indicated by the information contained in the possible query request including at least one section having a wildcard character, wherein according to the index, for any possible query requests, successive data records can be obtained as a query result; according to the encoding manner, establishing the index for the data records.

5 Claims, 8 Drawing Sheets

(56) References Cited

U.S. PATENT DOCUMENTS

| | | | |
|---|---|---|---|
| 6,470,297 B1 | 10/2002 | Ford | |
| 6,546,394 B1* | 4/2003 | Chong | G06F 17/30321 |
| 6,859,455 B1* | 2/2005 | Yazdani | G06F 17/30985 |
| | | | 370/392 |
| 7,747,563 B2 | 6/2010 | Gehring | |
| 7,831,626 B1* | 11/2010 | Depelteau | G06F 17/30327 |
| | | | 707/797 |
| 7,903,566 B2 | 3/2011 | Knapp et al. | |
| 7,941,413 B2* | 5/2011 | Kashiyama | G06F 17/30336 |
| | | | 707/696 |
| 7,966,301 B2* | 6/2011 | Toyama | G06F 17/30241 |
| | | | 702/2 |
| 8,027,990 B1* | 9/2011 | Mysen | G06F 17/3064 |
| | | | 707/758 |
| 8,055,645 B1* | 11/2011 | Sinha | G06F 17/30091 |
| | | | 707/626 |
| 8,059,551 B2 | 11/2011 | Milliken | |
| 8,086,641 B1* | 12/2011 | Carr | G06F 17/30327 |
| | | | 707/706 |
| 8,321,404 B1* | 11/2012 | Mysen | G06F 17/3064 |
| | | | 707/713 |
| 8,396,858 B2* | 3/2013 | Egan | G06F 17/30312 |
| | | | 707/711 |
| 8,473,532 B1* | 6/2013 | Ben | G06F 17/30091 |
| | | | 707/694 |
| 2003/0191737 A1* | 10/2003 | Steele | G06F 17/30864 |
| 2011/0128959 A1 | 6/2011 | Bando et al. | |

FOREIGN PATENT DOCUMENTS

| | | |
|---|---|---|
| JP | 2004000018 | 1/2004 |
| WO | WO2012/016327 A1 | 2/2012 |

OTHER PUBLICATIONS

Schmidt, Cristina Simona, "Flexible Information Discovery With Guarantees in Decentralized Distributed Systems", Doctorate of Philosophy Dissertation, Electrical and Computing Engineering, Rutgers University, New Brunswick, NJ, Oct. 2005, 149 pages.*

Kim, Jihyun, et al., "Efficient Multiple Aggregations of Stream Data", IMSCCS 2007, Iowa City, IA, Aug. 13-15, 2007, pp. 391-397.*

"IP address", Wikipedia, downloaded from: en.wikipedia.org/IP_address, on Nov. 13, 2015, pp. 1-11.*

Schmidt, Cristina, et al., "A Peer-to-Peer Approach to Web Service Discovery", World Wide Web: Internet and Web Information Systems, vol. 7, Issue 2, Jun. 2004, pp. 211-229.*

Antos, Associative Memories for IP Packet Routing, Feb. 2003, 15. 71 pages.

Allen et al., NAV-Network Analysis Visualization, 2013, 12 pages.

* cited by examiner

| *.*.*.* | A.*.*.* | A.B.*.* | A.B.C.* | A.B.C.D |
| a.b.c.d | a.b.c.d | a.b.c.d | a.b.c.d | a.b.c.d |
| *.*.*.* | A.*.*.* | A.B.*.* | A.B.C.* | A.B.C.D |
| a.b.c.* | a.b.c.* | a.b.c.* | a.b.c.* | a.b.c.* |
| *.*.*.* | A.*.*.* | A.B.*.* | A.B.C.* | A.B.C.D |
| a.b.*.* | a.b.*.* | a.b.*.* | a.b.*.* | a.b.*.* |
| *.*.*.* | A.*.*.* | A.B.*.* | A.B.C.* | A.B.C.D |
| a.*.*.* | a.*.*.* | a.*.*.* | a.*.*.* | a.*.*.* |
| *.*.*.* | A.*.*.* | A.B.*.* | A.B.C.* | A.B.C.D |
| *.*.*.* | *.*.*.* | *.*.*.* | *.*.*.* | *.*.*.* |

FIG. 3

| | | | | |
|---|---|---|---|---|
| *.*.*.*<br>a.b.c.d | A.*.*.*<br>a.b.c.d | A.B.*.*<br>a.b.c.d | A.B.C.*<br>a.b.c.d | A.B.C.D<br>a.b.c.d |
| *.*.*.*<br>a.b.c.* | A.*.*.*<br>a.b.c.* | A.B.*.*<br>a.b.c.* | A.B.C.*<br>a.b.c.* | A.B.C.D<br>a.b.c.* |
| *.*.*.*<br>a.b.*.* | A.*.*.*<br>a.b.*.* | A.B.*.*<br>a.b.*.* | A.B.C.*<br>a.b.*.* | A.B.C.D<br>a.b.*.* |
| *.*.*.*<br>a.*.*.* | A.*.*.*<br>a.*.*.* | A.B.*.*<br>a.*.*.* | A.B.C.*<br>a.*.*.* | A.B.C.D<br>a.*.*.* |
| *.*.*.*<br>*.*.*.* | A.*.*.*<br>*.*.*.* | A.B.*.*<br>*.*.*.* | A.B.C.*<br>*.*.*.* | A.B.C.D<br>*.*.*.* |

DATA PROCESSING METHOD, DATA QUERY METHOD IN A DATABASE, AND CORRESPONDING DEVICE

CROSS-REFERENCE TO RELATED APPLICATION

This application claims priority under 35 U.S.C. §119 from Chinese Application No. 201210224193.X filed Jun. 29, 2012, the entire contents of which are incorporated herein by reference.

BACKGROUND OF THE INVENTION

The present invention relates to the field of database techniques. More specifically, a data processing method, a data query method in a database, and a corresponding device.

With the continuous development of modern society, networks have gained wider and wider application and the amount of data transmitted over networks has become larger and larger. This data is generally stored in databases for processing and exploiting. For example, network data can be stored in a database for user behavior analysis, network measurement, optimization, and auditing. Due to the large amount and frequent variations of network data, large capacity and expandable databases are required for data storage. At the same time, as for various applications querying databases, fast querying on large capacity databases is very important.

In the prior art, query on relational databases is convenient and fast, but with poor scalability. Also in the prior art, NoSQL databases are non-relational databases characterized by easy expansion of one-dimensional indexes. However, these NoSQL databases provide unsatisfactory process performance and slower feedback on query results for multi-dimensional queries and multi-dimensional range queries. For most applications, there are two-dimensional queries for source IP addresses and destination IP addresses and two-dimensional range queries. It is difficult to meet such a demand in the prior art.

Therefore, improvements to prior art are still desired to solve the above-mentioned problems in prior art.

SUMMARY OF THE INVENTION

Accordingly, one aspect of the present invention is a computer implemented data processing method for a database, wherein the computer includes a processor communicatively coupled to a memory, wherein a query request for data records in the database includes information indicating a source IP address and a destination IP address, the source IP address including N sections, the destination IP address including M sections, both M and N being positive integers, the method of including: determining an index encoding manner for the database, wherein the index is an one-dimensional index including N+M sections, the encoding manner specifying a variation sequence of various sections for the index, wherein according to the index, for any possible query requests, successive data records can be obtained as a query result, at least one of the source IP address and the destination address indicated by the information contained in the possible query request include at least one section having a wildcard character, the wildcard character representing an arbitrary value in an allowed range; and, according to the encoding manner, establishing the index for the data records.

Another aspect of the present invention is a computer implemented data query method, wherein the computer includes a processor communicatively coupled to a memory, the method including: receiving a query request, the query request containing information indicating a source IP address and a destination IP address, at least one of the source IP address and the destination IP address including at least one section having a wildcard character, the wildcard character representing an arbitrary value in an allowed range; linearizing the source IP address and the destination IP address; and according to the linearized IP address, searching in a database having an one-dimensional index to obtain successive data records as a query result, wherein the data records in the database have been indexed according to the method including: determining an index encoding manner for the database, wherein the index is an one-dimensional index including N+M sections, the encoding manner specifying a variation sequence of various sections for the index, wherein according to the index, for any possible query requests, successive data records can be obtained as a query result, at least one of the source IP address and the destination address indicated by the information contained in the possible query request include at least one section having a wildcard character, the wildcard character representing an arbitrary value in an allowed range; and, according to the encoding manner, establishing the index for the data records.

Another aspect of the present invention is a device for data processing in a database, wherein a query request for data records in the database contains information indicating a source IP address and a destination IP address, the source IP address including N sections, the destination IP address including M sections, both M and N being positive integers, the device including: an encoding module, configured to determine an index encoding manner of the database, wherein the index is an one-dimensional index including N+M sections, the encoding manner specifying a variation sequence of various sections of the index, wherein according to the index, for any possible query requests, successive data records can be obtained as a query result, at least one of the source IP address and the destination address indicated by the information contained in the possible query request include at least one section having a wildcard character, the wildcard character representing an arbitrary value in an allowed range; and an index module, configured to establish the index for the data records according to the encoding manner.

Another aspect of the present invention is a data query device, including: a receiving module, configured to receive a query request, including information indicating a source IP address and a destination IP address, at least one of the source IP address and the destination IP address including at least one section having a wildcard character, the wildcard character representing an arbitrary value in an allowed range; a linearization module, configured to linearize the source IP address and the destination IP address; and a search module, configured to search in a database having an one-dimensional index according to the linearized IP address to obtain successive data records as a query result, wherein the data records in the database have been indexed.

DETAILED DESCRIPTION OF THE PREFERRED EMBODIMENT

The present invention provides a data processing method, a data query method in a database, and a corresponding device. The technical solutions provided in the present invention make a database easy to expand and query. This makes the storage, exploitation, and utilization of network data convenient. Some preferred embodiments will be described in more detail with reference to the accompanying drawings. Through the more detailed description of some embodiments of the present invention in the accompanying drawings, the objects, features, and advantages of the present invention are made more apparent. However, the present invention can be implemented in various manners and should not be construed to be limited to the embodiments disclosed herein. On the contrary, these embodiments are provided for the thorough and complete understanding of the present invention to convey the scope of the present invention to those skilled in the art. Generally, the same reference refers to the same component in the embodiments of the present invention.

Figure 1:
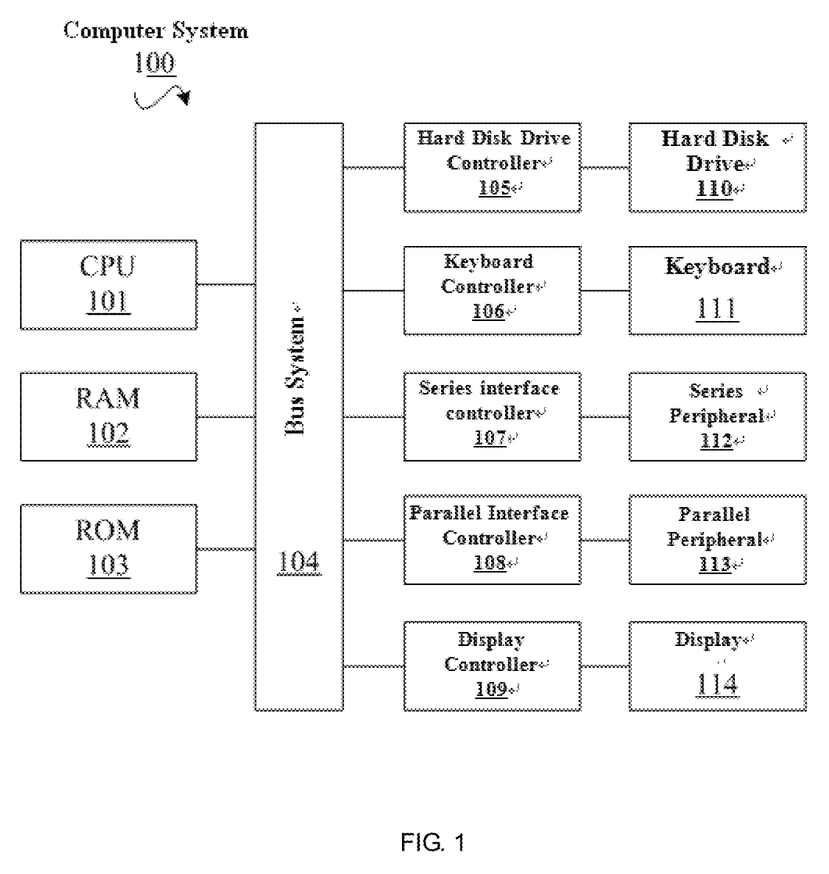
FIG. 1 shows an example of a computer system which implements the embodiments of the present invention.

FIG. 1 shows an example of a computer system 100 which implements the embodiments of the present invention. As shown in FIG. 1, the computer system 100 can include a CPU (Central Process Unit) 101, RAM (Random Access Memory) 102, ROM (Read Only Memory) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113, and display 114. The CPU 101, RAM 102, ROM 103, hard drive controller 105, keyboard controller 106, serial interface controller 107, parallel interface controller 108, and display controller 109 are all coupled to the system bus 104. The hard drive 110 is coupled to the hard drive controller 105 and the keyboard 111 is coupled to the keyboard controller 106. The serial peripheral equipment 112 is coupled to the serial interface controller 107 and the parallel peripheral equipment 113 is coupled to the parallel interface controller 108. The display 114 is coupled to the display controller 109. The structure as shown in FIG. 1 is only for exemplary purposes rather than a limitation to the present invention. In some cases, some devices can be added to or removed from the computer system 100 based on specific situations.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.), or an embodiment combining both software and hardware aspects that can all generally be referred to herein as a "circuit," "module," or "system." Furthermore, aspects of the present invention can take the form of a computer program product embodied in one or more computer readable mediums having computer readable program code embodied thereon.

Any combination of one or more computer readable mediums can be utilized. The computer readable medium can be a computer readable signal or storage medium. A computer readable storage medium can be, but is not limited to, an electronic, magnetic, optical, electromagnetic, infrared or semiconductor system, apparatus or device, or any suitable combination of the foregoing. More specific examples of the computer readable storage medium can include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

A computer readable signal medium can include a propagated data signal with computer readable program code embodied therein (for example, in baseband or as part of a carrier wave). Such a propagated signal can take any of a variety of forms including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium including, but not limited to, wireless, wireline, optical fiber cable, RF, etc., or any suitable combination of the foregoing.

Computer program code for carrying out operations for aspects of the present invention can be written in any combination of one or more programming languages including, but not limited to, an object oriented programming language (such as Java, Smalltalk, or C++) and conventional procedural programming languages (such as the "C" programming language or similar programming languages). The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatuses (systems), and computer program products according to embodiments of the present invention. It will be understood that each block of the flowchart illustrations and/or block diagrams and combinations of blocks in the flowchart illustrations and/or block diagrams can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 2:
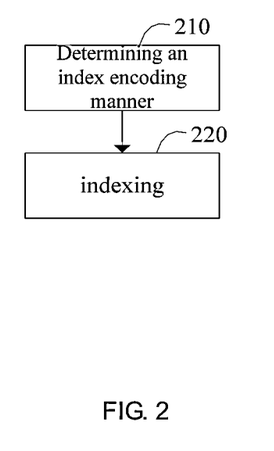
FIG. 2 shows a schematic flowchart of a data processing method in a database according to an embodiment of the present invention.

FIG. 2 shows a data processing method in a database according to an embodiment of the present invention, including the following steps: at step 210, determining an index encoding manner of the database; and at step 220, according to the encoding manner, indexing data records in the database. In this embodiment, a query request for data records in the database can include information indicating a source IP address and a destination IP address, which is a two-dimensional query request. The information indicating a source IP address and a destination IP address are, for example, special symbols representing a range of source IP addresses and a range of destination IP addresses. For the convenience of description and as an example for illustration in this and the following embodiments, a source IP address and a destination IP address are directly contained in a query request, wherein the source IP address has N sections, the destination IP address has M sections, and both N and M are positive integers. For example, as to IPv6 addresses, the source IP address and the destination IP address each have 8 sections, while as to IPv4 addresses, the source IP address and the destination IP address each have 4 sections. In this and following embodiments, for the convenience of description, a description will be given taking IPv4 source and destination IP addresses as an example. In this embodiment, at least one of the source IP address and the destination IP address of a possible query request includes at least one section having a wildcard character therein, the wildcard character representing an arbitrary value in an allowed value range. Taking IPv4 as an example also, a wildcard character * represents an arbitrary value from 0 to 255.

At step 210, the index is a one-dimensional index having N+M sections and the encoding manner includes specifying a variation sequence for various sections in the index. For example, the index includes 8 sections A, B, C, D, a, b, c, d, the encoding manner can define varying in turn from the last section to the first section or in other sequences. The database is not limited to only having one-dimensional indexes in this embodiment. For databases with multi-dimensional indexes, the method provided in this invention is also applicable. That is, the index is one of multiple dimensions and searches are performed based on this one-dimensional index. As the data structure of the index in this embodiment, various tree structures or hash list structures can be adopted in a particular form of pointers or direct data copy.

Figure 8:
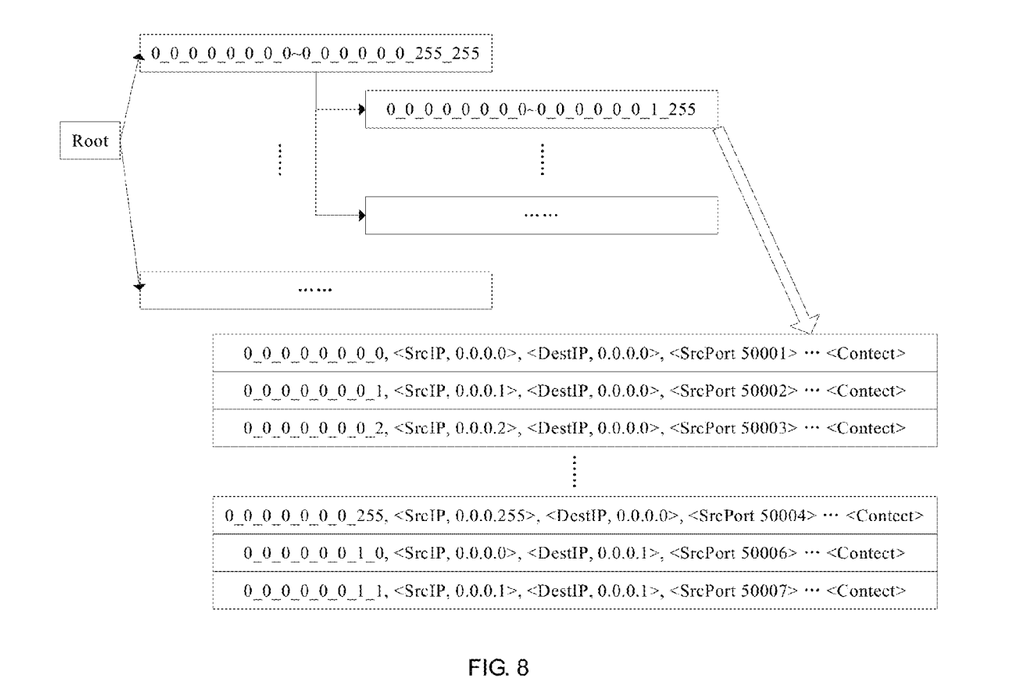
FIG. 8 shows an example of an index manner according to an embodiment of the present invention.

At step 220, since each data record includes a source IP address and a destination IP address, or corresponds to a source IP address and a destination IP address, an index of data records is established according to correspondence between various sections in the index and corresponding source and destination IP addresses in the data records. For example, taking the indexing manner shown in FIG. 8 as an example, the index A_B_C_D_a_b_c_d includes 8 sections, wherein A, B, C, D correspond to the first thru fourth sections of a source IP address, respectively, and a, b, c, d correspond to the first thru fourth sections of a destination IP address, respectively. As its encoding manner, various sections of the index varies from D first, and then d, c, b, a, C, B, A in turn according to that sequence. Establishing the index with this encoding manner, a data record corresponding to the source IP address 0.0.0.0 and the destination IP address 0.0.0.0 and a data record corresponding to the source IP address 0.0.0.1 and the destination IP address 0.0.0.0 are successive data records; a data record corresponding to the source IP address 0.0.0.255 and the destination IP address 0.0.0.0 and a data record corresponding to the source IP address 0.0.0.0 and the destination IP address 0.0.0.1 are successive data records. In this embodiment and other embodiments, for the convenience of description, the encoding manner is defined as M+N sections varying from back to front. For example, the encoding manner can be expressed as ABCabcdD.

In this embodiment, through determining the encoding manner and establishing an index according to the encoding manner, with the index, any possible query requests can obtain successive data records as their query results. Because the index is a one-dimensional index, it is easy to expand the corresponding database. Further, because any possible query requests can get successive data records as their query results, faster responses to corresponding database queries can be achieved without getting multiple data blocks first and then finding out corresponding data records from those data blocks.

In another embodiment, the encoding manner determined at step 210 can, for example, cover all possible query requests. If there are total W sections containing wildcard characters in the source and destination IP addresses of a query request, and the W sections varying first in the index encoded according to encoding manner 1 correspond to those W sections containing wildcard characters, the query request is covered by encoding manner 1. For example, the source IP of a query request is A. B. *. *, the destination IP is a. b. c. *, if the encoding manner is ABabcdCD, three sections varying first in the index encoded in such an encoding manner is DCd, corresponding to two sections containing wildcard characters in the source IP and a section containing a wildcard character in the destination IP, the query request can be covered by the encoding manner ABabcdCD. Given there are at most four sections containing wildcard characters in both of the source IP address and the destination IP address, five encoding manners abcdABCD, ABabcdCD, AabcdBCD, ABCabcdD and ABCDabcd can cover all query requests. In this embodiment and other embodiments, for the convenience of description, if the range of all possible query requests is query requests having source IP addresses and destination IP addresses, each of which can include at most four sections containing wildcard characters, the range is called as range 1.

In another embodiment, for example, step 210 includes: classifying all possible query requests; determining the number of classes of all possible query requests contained in a maximum mutually exclusive set; and determining X kinds of encoding manners, wherein x is the number of classes of all possible query requests contained in the maximum mutually exclusive set.

In the classification of all possible query requests, query requests can be classified according to sections containing wildcard characters in the source IP address and the destination IP address of a query request. That is, for query request in the same class, if there are total Y sections containing wildcard characters in the source and destination IP addresses of a query request, each other query request also includes Y corresponding sections in its source and destination IP addresses containing wildcard characters therein. For example, all query requests, each of which includes a source IP address having no wildcard characters in its sections and a destination IP address containing a wildcard character in its last section, belong to the same query request class. For example, if query request 1 has a source IP address 1.2.101.* and a destination IP address 205.*.*.*, query request 2 has a source IP address 100.2.5.* and a destination IP address 1.*.*.*, query requests 1 and 2 belong to the same query request class, which can be represented as A.B.C.*.a.*.*.*.

A mutually exclusive set includes at least two query request classes and any encoding manner is unable to cover any two of those query request classes in the same mutually exclusive set simultaneously. For example, a query request class represented by A.B.C.D.*.*.*.* and a query request class represented by A.B.C.*.a.*.*.* belong to the same mutually exclusive set and it is impossible to find out an encoding manner to simultaneously cover these two query request classes. For example, if the range of possible query requests is range 1, the maximum mutually exclusive set includes 5 query request classes *.*.*.*a.b.c.d, A.*.*.*a.b.c.*, A.B.*.*a.b.*.*, A.B.C.*a.*.*.*, and A.B.C.D*.*.*.*. Correspondingly, it is only needed to determine five encoding manners to cover all possible query requests.

Through classifying query requests and determining the number of classes of all query requests contained in a maximum mutually exclusive set, it is easy to determine how many encoding manners that are required to cover all query requests and obtain those encoding manners to perform index encoding according to these encoding manners. Thus, for all query requests, successive data records can be obtained as query results according to the encoded index without finding out data records in multiple data blocks, so that query speed can be greatly improved. Certainly, as understood by those skilled in the art, encoding manners required can also be determined in other manners.

In another embodiment, the maximum mutually exclusive set can be obtained through an exhaustive method. In this embodiment, determining X kinds of encoding manners includes: selecting X kinds of encoding manners from a set of encoding manners including all possible encoding manners; if the X selected encoding manners can cover all possible query requests, determining those X kinds of encoding manners as the final encoding manners, wherein X is the number of classes of query requests contained in the maximum mutually exclusive set. All possible encoding manners can be obtained through the exhaustive method. X kinds of encoding manners can be selected randomly or with a rule from those encoding manners to verify whether the X kinds of encoding manners can cover all possible query requests.

In order to make the acquisition of the maximum mutually exclusive set easier, a method of obtaining the maximum mutually exclusive set from a matrix is provided according to an embodiment of the present invention. The method requires establishing a $(P+1)*(Q+1)$ matrix, wherein P represents the maximum number of sections containing wildcard characters in the source IP address of any possible query request, Q represents the maximum number of sections containing wildcard characters in the destination IP address of any possible query request, and the objects represented by P and Q can be exchanged. If all possible requests are classified into S classes, each of S elements in the $(P+1)*(Q+1)$ matrix represents a query request class. Elements in the matrix are arranged such that elements corresponding to source IP addresses and destination IP addresses in query requests satisfy one of the following rules:

1) the number of sections containing wildcard characters in the source IP addresses gradually decreases from left to right and the number of sections containing wildcard characters in the destination IP addresses gradually increases from up to lower;
2) the number of sections containing wildcard characters in the source IP addresses gradually increases from left to right and the number of sections containing wildcard characters in the destination IP addresses gradually increases from up to lower;
3) the number of sections containing wildcard characters in the source IP addresses gradually decreases from left to right and the number of sections containing wildcard characters in the destination IP addresses gradually decreases from up to lower;
4) the number of sections containing wildcard characters in the source IP addresses gradually increases from left to right and the number of sections containing wildcard characters in the destination IP addresses gradually decreases from up to lower;
5) the number of sections containing wildcard characters in the destination IP addresses gradually decreases from left to right and the number of sections containing wildcard characters in the source IP addresses gradually increases from up to lower;
6) the number of sections containing wildcard characters in the destination IP addresses gradually increases from left to right and the number of sections containing wildcard characters in the source IP addresses gradually increases from up to lower;
7) the number of sections containing wildcard characters in the destination IP addresses gradually decreases from left to right and the number of sections containing wildcard characters in the source IP addresses gradually decreases from up to lower; or
8) the number of sections containing wildcard characters in the destination IP addresses gradually increases from left to right, and the number of sections containing wildcard characters in the source IP addresses gradually decreases from up to lower.

For the convenience of description, an element in the matrix is represented as $K_{ij}$, wherein i represents that the element is in the $i^{th}$ row, j represents that the element is in the $j^{th}$ column, and both i and j begin from 1. For instance, if the range of all possible query requests is range 1, all possible requests can be classified into 24 classes. The matrix is that one shown in FIG. 3. Wherein, the upper-right element represents a class of query requests, which do not have sections containing wildcard characters in their source IP addresses and destination IP addresses. Although this query request class does not belong to the range of possible query requests, the method provided in this embodiment is also applicable. Except for the upper-right element, each of other 24 elements corresponds to a class of possible query requests respectively and the arrangement of those elements satisfies rule 1) above.

According to positions of elements in the above matrix, the number of classes of possible query requests contained in the maximum mutually exclusive set can be determined. A description will be given with a detailed example. According to the matrix, a relative position relationship between two elements E and F is determined. The relative position relationship between two elements includes one of: one element above, below, on the left, on the right, on the lower left, on the upper left, on the upper right, or on the lower right of the other element. For any element in the matrix, if an element has a relative position relationship to that element satisfying the relative position relationship between element E and element F, the two elements belong to the same mutually exclusive set. According to such a rule, a maximum mutually exclusive set can be found and the number of classes of possible query requests contained in the maximum mutually exclusive set is determined. Wherein, query requests represented by element E have the maximum number of sections containing wildcard characters in their source IP addresses and the minimum number of sections containing wildcard characters in their destination IP addresses; query requests represented by element F have the maximum number of sections containing wildcard characters in their destination IP addresses and the minimum number of sections containing wildcard characters in their source IP addresses.

Figure 3:
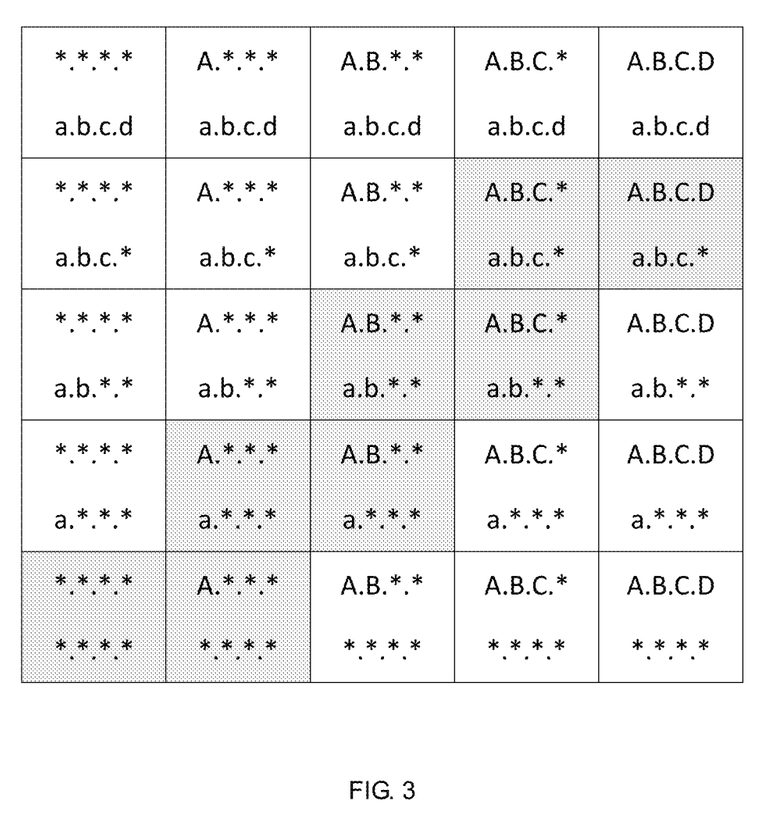
FIGS. 3-4 show examples of a matrix according to an embodiment of the present invention.

As to the matrix shown in FIG. 3, element E is element $K_{11}$ at the upper left corner, element F is element $K_{55}$ at the lower right corner, the relative position relationship between element E and element F is element E upper left to element F or element E lower right to element F. For example, if an element is located upper left to or lower right to element $K_{45}$, the element belongs to the same mutually exclusive set as element $K_{45}$. It can be seen, no element is on the lower right of element $K_{45}$, element $K_{34}$ is on the upper left thereof, then query requests represented by elements $K_{45}$ and $K_{34}$ belong to the same mutually exclusive set. Furthermore, element $K_{23}$ is on the upper left of element $K_{34}$ and $K_{45}$, so that query requests represented by these three elements belong to the same mutually exclusive set. Thereby, a maximum mutually exclusive set can be found. As for the matrix shown in FIG. 3, the maximum mutually exclusive set is constructed by query requests represented by the five elements on the diagonal from element E to element F. The number of classes of possible query requests contained in the maximum mutually exclusive set is 5. Thus, instead of the exhaustive method, through classifying query requests and constructing a matrix and then determining position relationships in the matrix between elements corresponding query requests within a mutually exclusive set, the maximum mutually exclusive set can be found in an easy and effective manner, which can reduce the amount of calculation and is convenient for computer implementation.

In another embodiment of the present invention, if P and Q have the same value and all query requests represented by the elements on the diagonal from element E to element F are possible query requests, the maximum mutually exclusive set is a mutually exclusive set formed by query requests represented by all elements on the diagonal from element E to element F.

With the above matrix, not only can the maximum mutually exclusive set be found easily to determine the number of classes of all possible query requests contained therein, but also the X kinds of encoding manners can be determined. Particularly, according to paths formed by elements in the matrix, the X kinds of encoding manners can be determined. Two particular exemplary methods will be given in this embodiment for the better understanding of how to find encoding manners from paths formed by elements in the matrix. Those skilled in the art can obtain appropriate encoding manners through other ways from the matrix. Below, a description will be given with a particular example in which the number of classes of possible query requests contained in the maximum mutually exclusive set is 5.

The first exemplary method is as follows: in the matrix and along a first direction and a second direction, each path from element G to any of element H and element I represents an encoding manner; acquire corresponding encoding manners after all paths have been found out; select five from all of those encoding manners, which can cover all possible query requests. Particularly, the first direction is a direction on which the number of sections containing wildcard characters in the source IP addresses of the query requests is unchanged while the number of sections containing wildcard characters in the destination IP addresses decreases by 1; the second direction is a direction on which the number of sections containing wildcard characters in the source IP addresses of the query requests decreases by 1 while the number of sections containing wildcard characters in the destination IP addresses is unchanged. A query request represented by element G has a source IP address and a destination IP address, each having the most number of sections containing wildcard characters therein; a query request represented by element H has a source IP address having only one section containing a wildcard character and a destination IP address having no sections containing wildcard characters; a query request represented by element I has a source IP address having no sections containing wildcard characters and a destination IP address having only one section containing a wildcard character.

The correspondence between a path and an encoding manner is as follows. If element H is reached, as the corresponding encoding manner, the section varying first is D; if element I is reached, as the corresponding encoding manner, the section varying first is d; further, comparing an element to its next element on a path from element G to find different sections and these sections vary in turn according to such a sequence, in which sections that have been found first vary after sections that have been found later. For the matrix shown in FIG. 3, element G is element $K_{51}$, element H is element $K_{14}$, element I is element $K_{25}$. The first direction is one step up. The second direction is one step right. A path satisfying the above requirements is from element G up to element $K_{11}$ and then to the right until element H is reached. As an encoding manner corresponding to such a path, due to the reached element is H, the section varying first of all is D; further, as compared to element $K_{41}$ next to element G on the path, a is the different section, and in turn, sections b, c, d, A, B, C can be found sequentially, resulting to an encoding manner abcdABCD. Taking the path labeled in gray shown in FIG. 3 as an example, because the last reached element is I, as a corresponding encoding manner, the section varying first of all is d and other sections vary in turn according to the sequence of D, c, C, b, B, a, A, leading to a corresponding encoding manner AaBbCcDd.

Those skilled in the art can understand that this path finding method can be expanded to find out all paths from element G to element J along a first direction and a second direction, wherein a query request representing by element J has a source IP address and a destination IP address, both of which do not have sections containing wildcard characters. It can be seen that, given paths run along the first direction and the second direction, a path that reaches element J must pass through element H or element I. According to the above manner, for the matrix shown in FIG. 3, 70 paths can be found, from which five paths are selected to determine whether encoding manners corresponding to these five paths can cover all possible query requests. If so, the five encoding manners are determined as final encoding manners. It can be understood that the selection of the five encoding manners has non-unique results.

The second exemplary method is as follows: in the matrix, along a first direction and a second direction, each path from element G to any of element H and element I represents an encoding manner; find out five paths, wherein each path passes through one of elements corresponding to query requests in the maximum mutually exclusive set, and the five paths as a whole pass through elements corresponding to all possible query requests, and encoding manners corresponding to these five paths can cover all possible query requests. Wherein, element G, element H, element I, the first direction, and the second direction have the same meanings as that in the first particular example, as well as the correspondence between paths and encoding manners. Still taking the matrix shown in FIG. 3 as an example, elements corresponding to query requests in the maximum mutually exclusive set are elements $K_{11}$, $K_{22}$, $K_{33}$, $K_{44}$, $K_{55}$, respectively. Five paths satisfying the above requirements are: 1) a first path passing through $K_{51}$, $K_{41}$, $K_{31}$, $K_{21}$, $K_{11}$, $K_{12}$, $K_{13}$, $K_{14}$; 2) a second path passing through $K_{51}$, $K_{52}$, $K_{42}$, $K_{32}$, $K_{22}$, $K_{23}$, $K_{24}$, $K_{25}$; 3) a third path passing through $K_{51}$, $K_{52}$, $K_{53}$, $K4_{43}$, $K_{33}$, $K_{34}$, $K_{35}$, $K_{25}$; 4) a fourth path passing through $K_{51}$, $K_{52}$, $K_{53}$, $K_{54}$, $K_{44}$, $K_{34}$, $K_{24}$, $K_{14}$; and 5) a fifth path passing through $K_{51}$, $K_{52}$, $K_{53}$, $K_{54}$, $K_{55}$, $K_{45}$, $K_{35}$, $K_{25}$. Correspondingly, these five paths correspond to encoding manners abcdABCD, AabcBCDd, ABabCDcd, ABCabcdD, and ABCDabcd.

Those skilled in the art can understand that the five paths satisfying the requirement of passing through elements corresponding to query requests in the maximum mutually exclusive set respectively and as a whole passing through elements corresponding to all possible query requests are non-unique and there are many methods for determining five paths satisfying the above requirements. An example is given below:

1) find out the most upper left element remained in the found maximum mutually exclusive set, determine a most peripheral path from the most lower left element in the current matrix to the most upper right element in the current matrix passing through the most upper left element, through working along only the up direction or the right direction;
2) remove all elements passed by the path to construct the current matrix by remained elements;
3) repeat 1) and 2), until element $K_{55}$ is remained; and
4) complete paths obtained above, in which the most lower left element on a path is connected to K51, along the left direction and the down direction; the most upper right element on the path is connected to K15 along the right direction and the up direction. Finally, K15 is removed to get five paths.

$K_{55}$ is element F, $K_{51}$ is element G, a query request represented by $K_{15}$ has a source IP address and a destination IP address, both of which do not have sections containing wildcard characters. $K_{15}$ does not have to be removed from those paths.

Figure 4:
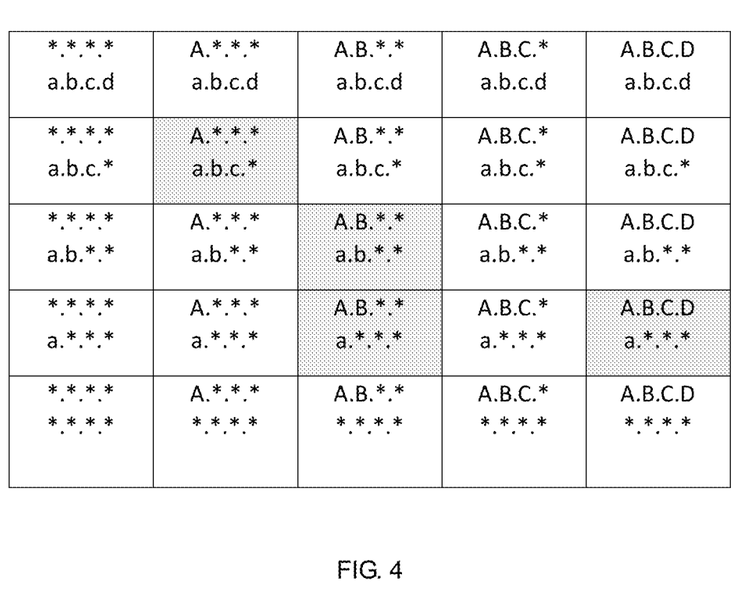

In this embodiment, to provide a more flexible data processing method, an instruction can be received, indicating a range of possible query request. The instruction can be issued by a user or an application. The instruction can include the values of P and/or Q. In another embodiment, the instruction can include the kinds of query requests that are impossible to present. For example, the instruction issued indicates four kinds of query requests A.*.*.*a.b.c.*, A.B.*.*a.b.*.*, A.B.*.*a.*.*.*, A.B.C.Da.*.*.* that can not exist. As shown in FIG. 4, elements labeled in gray represent non-existent query requests. According to the matrix, query requests represented by $K_{11}$, $K_{23}$, $K_{34}$ and $K_{55}$ construct a maximum mutually exclusive set. According to the method given in the second example, four paths are found: a first path passing through $K_{51}$, $K_{41}$, $K_{31}$, $K_{21}$, $K_{11}$, $K_{12}$, $K_{13}$, $K_{14}$, a second path passing through $K_{51}$, $K_{52}$, $K_{42}$, $K_{32}$, $K_{22}$, $K_{23}$, $K_{24}$, $K_{25}$, a third path passing through $K_{51}$, $K_{52}$, $K_{53}$, $K_{54}$, $K_{44}$, $K_{34}$, $K_{35}$, $K_{25}$, and a fourth path passing through $K_{51}$, $K_{52}$, $K_{53}$, $K_{54}$, $K_{55}$, $K_{45}$, $K_{35}$, $K_{25}$. Corresponding encoding manners obtained are abcdABCD, AabcBCDd, ABCabDcd, and ABCDabcd. Through allowing a user or an application to specify the range of possible query requests, encoding manners required can be decreased to some extent, correspondingly, the index can be reduced to save storage space and make the solution more flexible.

It can be seen from the above description, through using a database with a one-dimensional index, the data processing method in a database provided in this embodiment makes the expansion of a large capacity database easy to realize, at the same time, specific index encoding manners are adopted to prevent time and computing costs resulted from obtaining multiple data blocks and finding a final query result from the multiple data blocks and, thus, query speed can be improved. Further, the data processing method provided in this embodiment converts the determination of the maximum mutually exclusive set to position relationships between elements in a matrix and the determination of X kinds of encoding manners can be further converted to finding paths formed by elements in the matrix, which make the determination of the encoding manner more easy, at the same time, paths satisfying requirements can be determined through several path processing techniques, enabling more flexible implementations.

Figure 5:
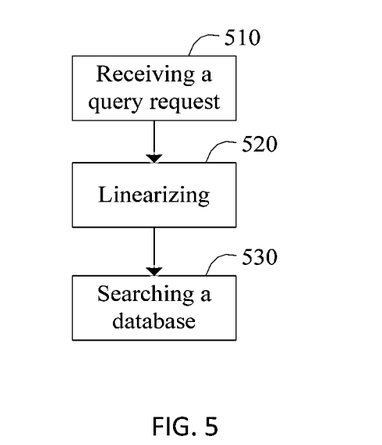
FIG. 5 shows a schematic flowchart of a data query method according to an embodiment of the present invention.

As shown in FIG. 5, a data query method is provided in an embodiment of the present invention. The method includes: at step 510, receiving a query request; at step 520, linearizing a source IP address and a destination IP address specified by information contained in the query request; at step 530, according to the linearized IP address, searching a database having one-dimensional indexes to get successive data records as a query request. In this embodiment, the database to be queried is indexed according to the method of the embodiment shown in FIG. 2. The embodiment shown in FIG. 2 can be referred for particular details. The query request received at step 510 includes information indicating a source IP address and a destination IP address, at least one of the source IP address and the destination IP address having at least one section containing a wildcard character. The embodiment shown in FIG. 2 can be referred for more particular implementation details and examples.

In this embodiment, because the indexes of the database are one-dimensional indexes, the source IP address and the destination IP address must be linearized to be converted to one-dimensional addresses. The linearization of the source and destination IP addresses at step 520 particularly includes linearizing the source and destination IP addresses according to each index encoding manner of the database. Step 520 particularly further includes determining encoding manners of the database indexes that can cover query requests and linearizing the source IP address and the destination IP address according to the encoding manners. It can be seen that if the source and destination IP addresses are linearized according to each encoding manner, a search can be performed according to indexes encoded based on various encoding manners simultaneously. If an encoding manner can cover this query request, the query on the corresponding index can obtain a query result faster and the result is used as the final query result. If an encoding manner that can cover the query request is determined first and then the source and destination IP addresses are linearized according to such an encoding manner, a query can be performed on the index corresponding to this encoding manner to get a query result.

For example, taking the matrix shown in FIG. 4 as an example, indexes are encoded in four encoding manners (abcdABCD, AabcBCDd, ABCabDcd, and ABCDabcd) in the database. A query request is issued by a user, including a source IP address 10.*.*.* and a destination IP address 20.102.*.*. If the linearization of the first implementation is used, the linearization result is 20.102.*.*.10.*.*.*, 10.20.102.*.*.*.*.*, 10.*.*.20.102.*.*.* and 10.*.*.*.20.102.*.*. It can be seen that, according to an IP address linearized in the second encoding manner, a query on the index corresponding to the second encoding manner can get successive data records as a query result and, thus, the query result can be fed back faster. If the linearization of the second implementation is used, it can be determined that the second encoding manner can cover a class of query requests A.*.*.*a.b.*.*, thus the source and destination IP addresses can be linearized directly according to the second encoding manner and then a query can be performed on the index corresponding to the second index manner to get successive data records as a query result. It can be seen that the two implementations have their own advantages, respectively, and different implementations can be adopted as appropriate in practice. The data query method provided in this embodiment can improve query speed and raise user satisfaction.

Those skilled in the art can understand that the methods of embodiments above can be combined with each other to obtain more technical solutions.

Figure 6:
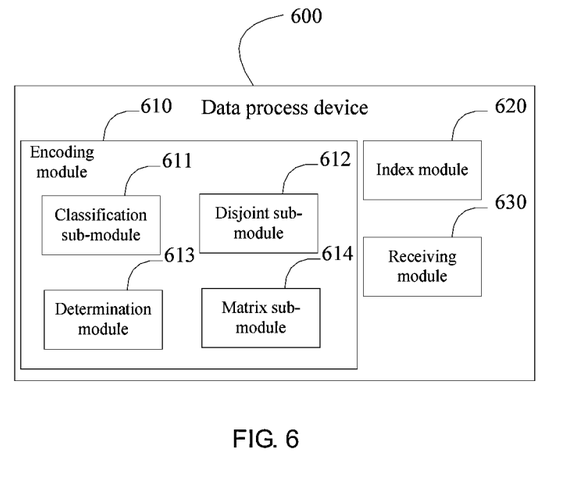
FIG. 6 shows a schematic structure of a device for data processing in a database according to an embodiment of the present invention.

As shown in FIG. 6, a data process device 600 in a database is provided in an embodiment of the present invention. The device 600 includes: an encoding module 610 and an index module 620. The encoding module 610 is configured to determine encoding manners of indexes of the database, wherein the index is an one-dimensional index including N+M sections, and the encoding manner specifies a varying sequence of various sections of the index. The index module 620 is configured to, according to the determined encoding manners, establish indexes for the data records, wherein according to the indexes, for any possible query request, successive data records can be obtained as a query result. Wherein, the possible query requests are the same as those in the embodiment shown in FIG. 2. In this embodiment, a reference can be made to the method of the above embodiment for particular details and explanations, which will not be repeated herein.

In another embodiment of the present invention, the encoding manners determined by the encoding module 610 can cover all possible query requests. The method of the above embodiment can be referred for the detailed description about the coverage, which will not be repeated herein.

In another embodiment of the present invention, the encoding module 610 can include a classification sub-module 611, a disjoint sub-module 612, and a determination sub-module 613. The classification sub-module 611 is configured to classify all possible query requests. The disjoint sub-module 612 is configured to determine the number of classes of the possible query requests contained in a maximum mutually exclusive set. The determination module 613 is configured to determine X kinds of encoding manners. Wherein, the method of the embodiment above can be referred for the classification of query requests, the definition of the mutually exclusive set and X, which will not be repeated herein.

In another embodiment of the present invention, the encoding module 610 can further include a matrix sub-module 614. The matrix sub-module 614 is configured to get a (P+1)*(Q+1) matrix. Wherein, for the construction method of the matrix and the definition of elements therein, a reference can be made to the method of the embodiment above, which will not be repeated herein. Correspondingly, the disjoint sub-module 612 is particularly configured to, according to the matrix, determine the number of classes of all possible query requests contained in a maximum mutually exclusive set. Further, the determination module 613 is particularly configured to, according to the matrix, determine X kinds of encoding manners.

In another embodiment of the present invention, the disjoint sub-module 612 is particularly configured to, according to position relationships between elements in the matrix, determine the number of classes of all possible query requests contained in a maximum mutually exclusive set.

In another embodiment of the present invention, the determination sub-module 613 is particularly configured to, according to paths constructed by elements in the matrix, determine X kinds of encoding manners.

For example, the disjoint sub-module 612 includes: a position sub-block, configured to determine a relative position relationship between element E and element F, wherein the method embodiment can be referred for the relative position relationship; an amount sub-block configured to determine the number of classes of all possible query requests contained in a maximum mutually exclusive set according to the relative position relationship between element E and element F. For the method of determining the relative position relationship and obtaining the maximum mutually exclusive set, the method embodiment above can be referred, which will not be repeated herein.

For example, the determination sub-module 613 includes: a first path sub-block, configured to determine all encoding manners according to paths in the matrix; a selection sub-block, configured to arbitrarily select X kinds of encoding manners from all of the encoding manners, wherein the X kinds of encoding manners can cover all possible query requests. For how to determine encoding manners from paths, how to find paths, and how to select the X kinds of encoding manners, the method embodiment above can be referred, which will not be repeated herein.

For example, the determination sub-module 613 includes: a second path sub-block, configured to find X paths in the matrix; an acquisition sub-block, configured to acquire X kinds of encoding manners corresponding to the X paths. For how to find the X paths etc, the method embodiment above can be referred, which will not be repeated herein.

In another embodiment of the present invention, the device 600 further includes a receiving module 630, configured to receive an instruction for specifying a range of possible query requests. For how to specifying a range of possible query requests by an instruction, the method embodiment above can be referred in detail, which will not be repeated herein.

With the device provided in the above embodiment, a large scale database can be expanded more easily and query can be performed faster, instead of finding data records as a query result in multiple data blocks, successive data records can be directly acquired as the query result. Furthermore, through query request classification and matrixing, the device simplifies the determination of encoding manners to the path processing in a matrix or element determination, greatly reducing computing amount.

Those skilled in the art can understand that more technical solutions can be obtained through the combinations of various devices in the above embodiments.

Figure 7:
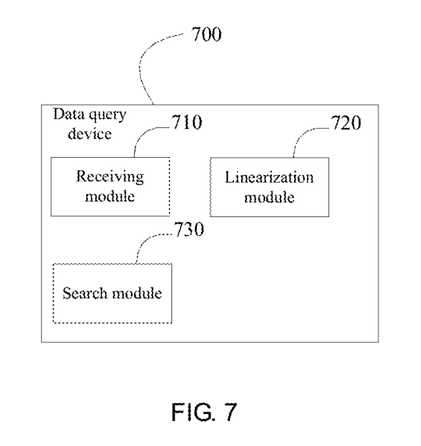
FIG. 7 shows a schematic structure of a data query device according to an embodiment of the present invention.

As shown in FIG. 7, a data query device 700 is further provided in an embodiment of the present invention. The device 700 includes: a receiving module 710, configured to receiving a query request; a linearization module 720, configured to linearizing a source IP address and a destination IP address; and a search module 730, configured to, according to a linearized IP address, search in a database having a one-dimensional index to get successive data records as a query result. In this embodiment, the index is established in the database according to the data processing method provided in the method of the above embodiment. The method of the above embodiment can be referred for query requests and the like, which will not be repeated herein.

In another embodiment of the present invention, the device 700 includes the device 600 shown in FIG. 6 for establishing an index for the database.

In another embodiment of the present invention, the linearization module 720 is configured to, according to each index encoding manner of the database, linearize the source IP address and the destination IP address.

In another embodiment of the present invention, the linearization module 720 is configured to determine an index encoding manner that can cover the query request and linearize the source IP address and the destination IP address according to that encoding manner.

More technical solutions can be obtained through the combinations of the above embodiment shown in FIG. 7. The device provided in the embodiment shown in FIG. 7 can improve query response speed.

The details of the embodiments as shown in FIGS. 6 and 7 can refer to the corresponding methods as described with reference to the disclosure.

The flowchart and block diagrams in the figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function or functions. It should also be noted that, in some alternative implementations, the functions noted in the block can occur out of the order noted in the figures. For example, two blocks shown in succession can, in fact, be executed substantially concurrently or the blocks can sometimes be executed in the reverse order depending upon the functionality involved. It will also be noted that each block of the block diagrams and/or flowchart illustration and combinations of blocks in the block diagrams and/or flowchart illustration can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer implemented data query method for a database comprising:
   receiving a query request, the query request containing a source IP address comprising a plurality of first sections and a destination IP address comprising a plurality of second sections, at least one of the sections having a wildcard character representing an arbitrary value in an allowed range;
   generating a linearized IP address from the source IP address and the destination IP address by generating a linearized result comprising different sequences of the first and second sections, wherein each sequence is associated with one of a plurality of different index encoding manners of the database; and
   searching in the database having a one-dimensional index according to one of the sequences to obtain successive data records as a query result.

2. A non-transitory computer readable storage medium tangibly embodying a computer readable non-transitory program code having computer readable instructions which, when implemented, cause a computer to carry out the steps of the method for data query according to claim 1.

3. The computer implemented data query method of claim 1, wherein each IP address has either an IPv4 or IPv6 format.

4. The computer implemented data query method of claim 3, wherein the wildcard character represents an arbitrary value from 0 to 255.

5. The computer implemented data query method of claim 1, wherein a count of the first sections is N, a count of the second sections is M, and the one-dimensional index includes N+M sections.

* * * * *